(12) United States Patent
Knoop et al.

(10) Patent No.: US 7,729,841 B2
(45) Date of Patent: Jun. 1, 2010

(54) METHOD AND DEVICE FOR PREDICTING THE TRAVELLING TRAJECTORIES OF A MOTOR VEHICLE

(75) Inventors: Michael Knoop, Ludwigsburg (DE); Goetz Braeuchle, Reichartshausen (DE); Hermann Winner, Bietigheim (DE); Michael Weilkes, Sachsenheim (DE); Martin Heinebrodt, Stuttgart (DE); Werner Uhler, Bruchsal (DE); Wolfgang Hermsen, Kirchheim (DE); Joachim Thiele, Beilstein (DE); Martin Staempfle, Ulm (DE); Fred Oechsle, Ludwigsburg (DE); Ulf Wilhelm, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/380,090

(22) PCT Filed: Jul. 11, 2002

(86) PCT No.: PCT/DE02/02538

§ 371 (c)(1),
(2), (4) Date: Sep. 10, 2003

(87) PCT Pub. No.: WO03/006288

PCT Pub. Date: Jan. 23, 2003

(65) Prior Publication Data

US 2004/0030498 A1 Feb. 12, 2004

(30) Foreign Application Priority Data

Jul. 11, 2001 (DE) ................................ 101 33 029

(51) Int. Cl.
*G06F 19/00* (2006.01)
*B60T 8/00* (2006.01)

(52) U.S. Cl. ..................... 701/80; 180/197; 180/179; 303/176

(58) Field of Classification Search ................... 701/93, 701/70–73, 301, 80, 78; 180/167, 197, 179; 340/903; 303/113.1, 146, 150, 176, 157; 364/426.02, 426.03, 424.05
See application file for complete search history.

(56) References Cited

U.S. PATENT DOCUMENTS

| 5,332,057 A | 7/1994 | Butsuen et al. |
| 5,471,386 A * | 11/1995 | Hrovat et al. ................. 701/82 |
| 5,517,414 A * | 5/1996 | Hrovat ........................ 701/91 |

(Continued)

FOREIGN PATENT DOCUMENTS

EP 0 967 121 12/1999

(Continued)

OTHER PUBLICATIONS

Winner, Witte, et al., "Adaptive Cruise Control System—Aspects and Development Trends", SAE paper 96 10 10, International Congress and Exposition, Detroit, Michigan, Feb. 26-29, 1996.

(Continued)

*Primary Examiner*—Khoi H. Tran
*Assistant Examiner*—Ronnie Mancho
(74) *Attorney, Agent, or Firm*—Kenyon & Kenyon LLP

(57) ABSTRACT

In a method and a device for predicting movement trajectories of a vehicle to prevent or reduce the consequences of an imminent collision, in which for predicting the movement trajectories, only those trajectories are considered for which, because of a combination of steering intervention and braking intervention, the forces occurring at the wheels of the vehicle are within the range corresponding to the maximum force transferable from the wheel to the road. Particularly for systems which provide an automatic braking and/or steering intervention for avoiding a collision or reducing the severity of a crash with another object, an automatic braking and/or steering intervention is carried out as a function of the pre-calculated movement trajectories.

6 Claims, 3 Drawing Sheets

U.S. PATENT DOCUMENTS

| | | | | |
|---|---|---|---|---|
| 5,519,617 | A | * | 5/1996 | Hughes et al. ................. 701/84 |
| 5,576,959 | A | * | 11/1996 | Hrovat et al. ................. 701/70 |
| 6,084,508 | A | * | 7/2000 | Mai et al. .................... 340/463 |
| 6,359,553 | B1 | * | 3/2002 | Kopischke .................. 340/436 |
| 6,415,230 | B1 | * | 7/2002 | Maruko et al. .............. 701/301 |
| 6,445,308 | B1 | * | 9/2002 | Koike .......................... 340/902 |
| 6,470,731 | B1 | * | 10/2002 | Rieth .............................. 73/9 |
| 6,490,518 | B1 | * | 12/2002 | Walenty et al. ............... 701/71 |
| 6,567,748 | B2 | * | 5/2003 | Matsuno ...................... 701/301 |
| 6,571,176 | B1 | * | 5/2003 | Shinmura et al. ........... 701/301 |

FOREIGN PATENT DOCUMENTS

| | | |
|---|---|---|
| JP | 4-331668 | 11/1992 |
| JP | 5-058319 | 3/1993 |
| JP | 2000-128007 | 5/2000 |
| JP | 2000-142281 | 5/2000 |
| JP | 2000-159077 | 6/2000 |

OTHER PUBLICATIONS

Gehrig and Stein, A Trajectory-Based Approach for the Lateral Control of Vehicle Following Systems:, IEEE International Conference on Intelligent Vehicles, 1998.

* cited by examiner

METHOD AND DEVICE FOR PREDICTING THE TRAVELLING TRAJECTORIES OF A MOTOR VEHICLE

CROSS-REFERENCE TO RELATED APPLICATIONS

This application is a U.S. national phase patent application of PCT/DE02/02538, which was filed Jul. 11, 2002, and claims priority to and the benefit thereof and of German patent application no. 10133029.4, which was filed in Germany on Jul. 11, 2001, the disclosures of which are incorporated herein by reference in their entirety.

FIELD OF THE INVENTION

The present invention relates to a method and a device for predicting movement trajectories of a vehicle to prevent a collision or reduce the severity of the crash, in which for predicting the movement trajectories, only those trajectories are considered for which, because of a combination of steering intervention and braking intervention, the forces occurring at the wheels of the vehicle are, e.g., as great as the force transferable at a maximum from the wheel to the road. Particularly for systems which provide an automatic braking and/or steering intervention for avoiding a collision with another vehicle, an automatic braking and/or steering intervention is carried out as a function of the pre-calculated movement trajectories.

BACKGROUND INFORMATION

In recent years, adaptive cruise controllers have increasingly come on the market which expand the conventional control of a vehicle-speed controller to the effect that the distance and relative velocity of the preceding vehicle are detected by a radar or lidar system, and this data is utilized for the speed control and/or distance control of one's own vehicle.

Such a system is described in the paper "Adaptive Cruise Control System—Aspects and Development Trends" by Winner, Witte et al., SAE paper 96 10 10, International Congress and Exposition, Detroit, Feb. 26-29, 1996.

In the publication "A Trajectory-Based Approach for the Lateral Control of Vehicle Following Systems" by Gehrig and Stein, presented at the IEEE International Conference on Intelligent Vehicles, 1998, an algorithm is described, which, from the measured data of a radar or lidar sensor, creates a movement trajectory of the preceding vehicle, and controls one's own vehicle according to it. Particularly for movements in which both vehicles are driving into or out of a curve, special demands are made on such a trajectory algorithm. An algorithm of this type for determining movement trajectories is presented by way of example in the aforesaid document.

In the book "Fahrwerktechnik: Fahrverhalten" by Zomotor, from Vogel Book Publishing, Würzburg, first edition 1987, in chapter 2, "Forces on the Vehicle", the theoretical fundamentals are explained which are necessary for understanding the transfer of force between tire and roadway.

SUMMARY

When pre-calculating all possible movement trajectories of a preceding vehicle or of one's own vehicle, great demand for computing power may be made on the prediction system for pre-calculating the further movement. This may be because a great number of possible movements of the vehicle may be taken into account. Particularly in dangerous situations, in which a strong deceleration or a sharp steering movement may be expected, this large number of possible movements may increase even further. Since in this case, a real-time processing of the movement trajectories may be desired, it may be necessary to use a powerful computer system.

In this context, it may be provided in calculating the movement trajectories, which in the case of an imminent collision may result from steering operations, braking operations or combined steering and braking operations, to be able to calculate them in advance. To minimize the computing expenditure, it may be provided that only those trajectories be pre-calculated for which, because of a combination of steering intervention and braking intervention, the force occurring at the wheels of the vehicle is in the range of the maximum force transferable from the wheel to the road. It may be assumed that, in response to driving through one of these trajectories, the imminent collision with an object may be prevented, or, in the event that a collision may not be avoidable, it may at least be possible to reduce the severity of the crash. To be understood by crash severity is, in this case, the extent of damage from the collision, which may be dependent on the impact energy, but also, for example, on the constitution of the object. Thus, for example, given equal impact energy, the crash severity for a collision with a concrete wall may be greater than for a collision with a preceding vehicle.

This method for pre-calculating movement trajectories may be used on one's own vehicle that is equipped with a radar, lidar or video system, but also on other vehicles detected by the surroundings sensor system.

It may be provided that the surroundings sensor system is composed of a radar sensor, a lidar sensor, a video sensor, etc., or a combination thereof. If a vehicle is equipped with more than one surroundings sensor, it may be possible to ensure a more reliable and higher-resolution detection.

Moreover, it may be provided that the maximum force transferable from the wheel to the road may be corrected as a function of an instantaneous situation. In particular, this maximum transferable force may change due to wetness or snow on the roadway. To ascertain the instantaneous roadway coefficient of friction, which co-determines the maximum force transferable from the wheel to the road, the signals from an anti-lock device and/or an electronic stability program may be utilized. Moreover, it is also possible that signals from further surroundings sensors, such as a rain sensor or a poor-weather detection, may be utilized by the radar, lidar or video sensor system for determining the instantaneous wheel-slip value.

In addition, it may be provided that the predicted movement trajectories may be used for the automatic control of the deceleration devices and/or for the automatic control of the vehicle steering devices, in order to avoid an imminent collision with a preceding vehicle or object.

The method according to the present invention may be implemented in the form of a control element provided for a control unit of an adaptive distance and/or speed control of a motor vehicle. In this context, the control element has stored on it a program that may be executable on a computing element, e.g., on a microprocessor, an ASIC, etc., and may be suitable for carrying out the method of the present invention. Thus, in this case, the present invention may be realized by a program stored on the control element, so that this control element provided with the program may constitute an example embodiment of the present invention in the same manner as the method, for whose execution the program may be suitable. An electrical storage medium, e.g., a read-only memory, may be used as control element.

Further features, uses and aspects of the present invention are described in the following description of exemplary embodiments of the present invention which are illustrated in the drawings. In this context, all of the described or represented features, alone or in any combination, form the subject matter of the present invention, regardless of their combination, as well as regardless of their formulation and representation in the following description and drawings, respectively.

In the following description, exemplary embodiments of the present invention are explained with reference to the Drawings.

DETAILED DESCRIPTION

Figure 1:
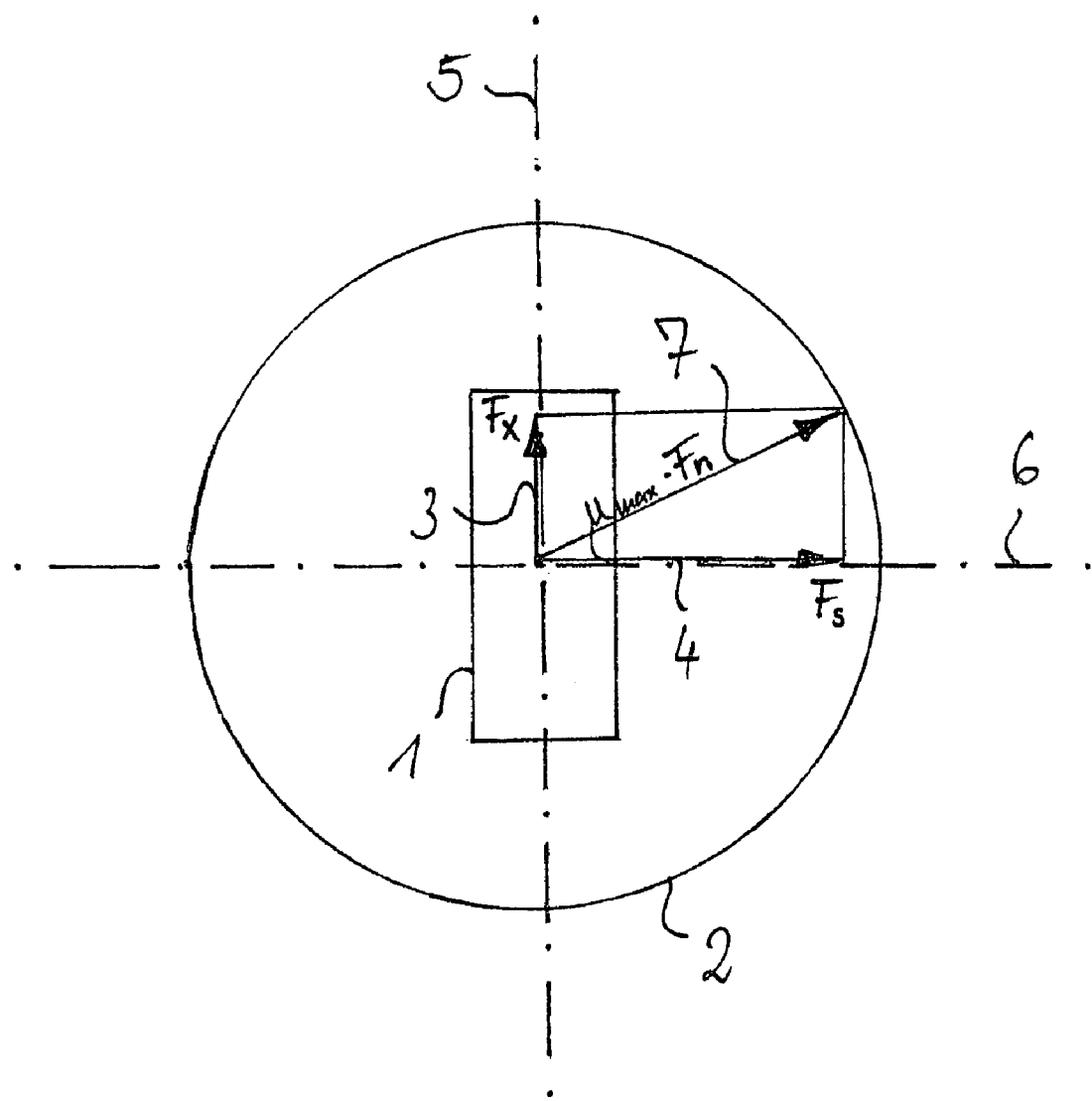
FIG. 1 is a schematic view of the forces which may occur at a maximum on a wheel without it losing its road adhesion.

FIG. 1 illustrates a construction in which forces 3, 4, 7 occurring at a wheel 1 are indicated. This construction is referred to by the name Kamm circle. The plan view illustrates a wheel 1 through which a dot-dash line 5 is drawn in the longitudinal direction, and a dot-dash line 6 is drawn in the transverse direction. The forces which occur between a wheel and the roadway may be divided into the longitudinal direction, thus parallel to dot-dash line 5, and the transverse direction, thus parallel to dot-dash line 6. The additionally occurring vertical force, resulting due to the weight of the vehicle, is not indicated. A force arrow 3, representing the longitudinal forces acting on the tire, is illustrated in parallel to line 5. These longitudinal forces are generally deceleration and acceleration forces which influence the vehicle in the straight-ahead direction. Moreover, a force arrow 4 is marked in which acts parallel to transverse line 6. These lateral forces, represented by this force arrow 4, develop due to steering movements of the vehicle, and cause the vehicle to change direction. A force arrow 7 is also illustrated which represents the diagonal of a rectangle that is constructed on the two force arrows 3 and 4. This force arrow 7 represents the resulting force of both individual forces 3, 4 in the longitudinal and transverse directions. Thus, force arrow 7 represents a position or radius vector with origin in the point of intersection of lines 5 and 6, the length and direction of which are determined by the amounts of the individual components longitudinal force 3 and transverse force 4. If one plots in this construction all points at which the resultant force of the longitudinal and lateral forces is the same amount as the product of the maximum coefficient of friction between roadway and tire $\mu$max and vertical force Fn acting on the wheel, then one obtains a circle the center point of which corresponds to the point of intersection of lines 5 and 6. If force 7 resulting from longitudinal force 3 and transverse force 4 is greater according to the amount than the product $\mu$max*Fn, then the end of the position vector of the resulting force is outside of constructed circle 2. In this case, the wheel has already lost its adhesion to the roadway. If one would like to move a vehicle such that the adhesion of the wheels to the roadway is present at any time, then it may be necessary that the adhesion of the wheels to the roadway is present at any time. Thus, it may be necessary to assure that resultant force 7 from longitudinal force 3 and transverse force 4 is smaller according to the amount at each point of time than circle 2 constructed due to the coefficient of friction and the vertical force.

Figure 2:
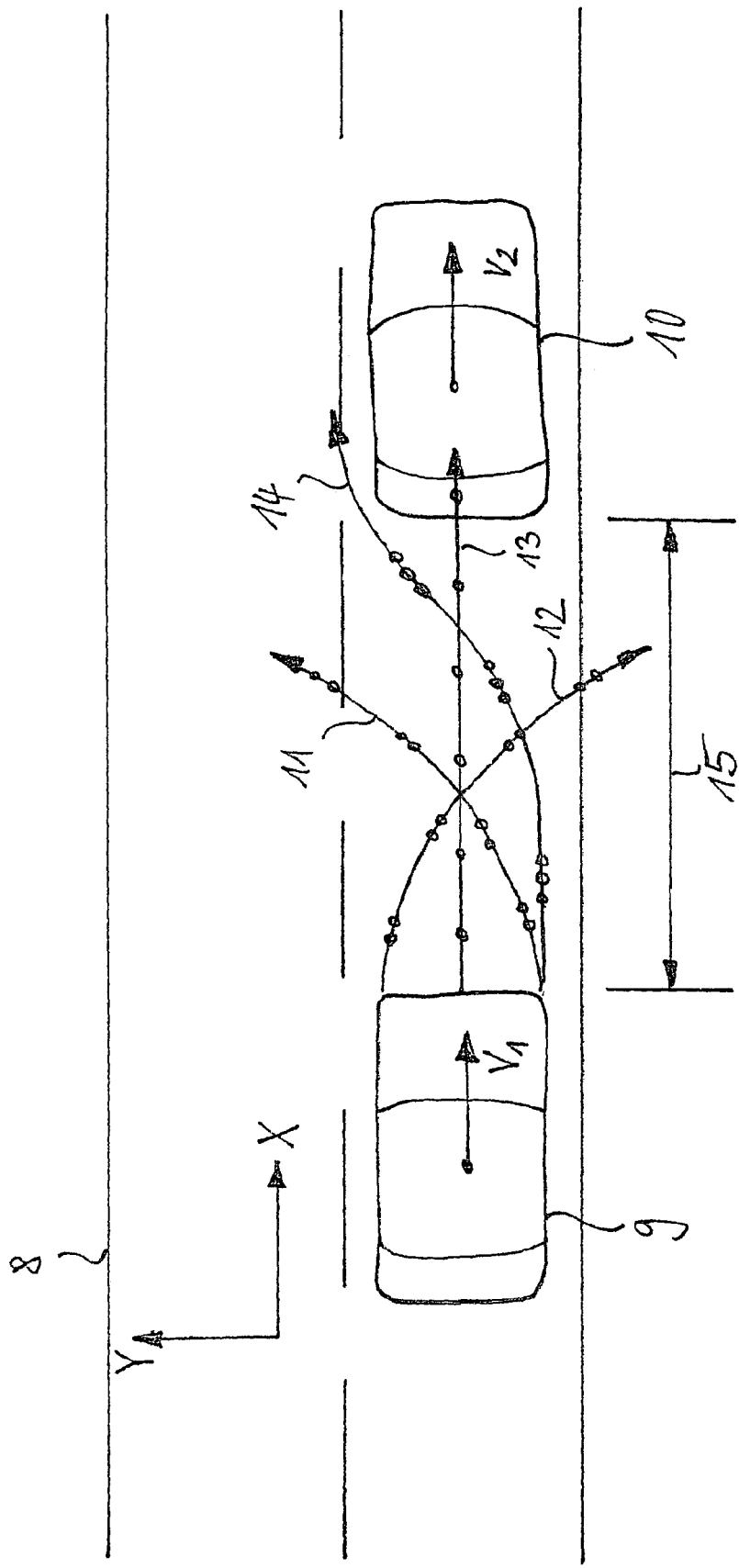
FIG. 2 illustrates a traffic situation in which the method of the present invention may be used.

FIG. 2 illustrates a possible traffic situation. One sees a road 8 upon which two vehicles 9, 10 are moving. The movements of vehicles 9, 10 are indicated by velocity arrows v1, v2. Vehicle 9 following preceding vehicle 10 is equipped with a device according to the present invention for carrying out the method according to the present invention. If velocity v1 of vehicle 9 is very much greater than velocity v2 of vehicle 10, then in this case there may be a risk of collision, since distance 15 between the two vehicles may not be sufficient to avoid this collision by a maximum possible deceleration of vehicle 9. If in this case an automatically triggered emergency braking were used, then a trajectory as represented by single-dotted arrow 13 may result for the further vehicle movement. In this case, it may be possible that distance 15 between the two vehicles 9 and 10 may not be sufficient to come to a standstill in time. In the event of such a full-brake application without steering movement, longitudinal force 3 may assume a maximum value $\mu$max*Fn. Lateral force 4 may be equal to zero.

Figure 3:
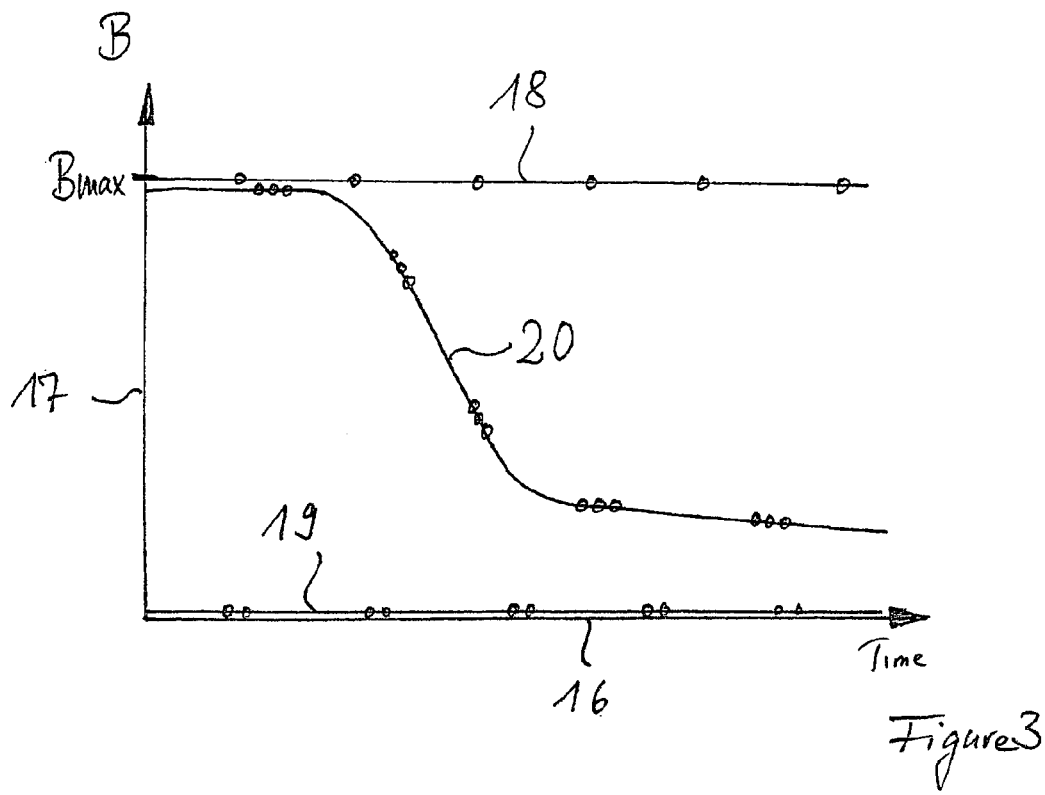
FIG. 3 illustrates a braking force/time diagram of the trajectories illustrated in FIG. 2.

Another possibility for avoiding a collision in the traffic situation described may be a pure evasion maneuver. In this case, one may not carry out a braking intervention, but rather may provide as sharp a steering angle as possible. Such a procedure is represented by double-dotted movement trajectories 11 and 12. In this case, one may have a longitudinal force 3 equal to zero and a maximum transverse force 4 in the construction of Kamm circle 2. During this maneuver, it may easily happen that, due to too sharp a steering angle, the maximum possible lateral force may be exceeded and the vehicle may go into a spin. A combined braking and steering intervention, as is represented by triple-dotted movement trajectory 14, may be provided in the traffic situation illustrated. To clarify the combined braking and steering intervention, reference is made to FIG. 3. In FIG. 3, a braking force/time diagram is illustrated in which the time is plotted on abscissa 16, and the braking force is plotted on ordinate 17. For the case of a full brake application as is represented in FIG. 2 by single-dotted movement trajectory 13, a braking force/time diagram may result as is represented by single-dotted line 18. In the case of the emergency braking, this may be a horizontal line which may correspond to a maximum possible, constant braking-force value. The second alternative from FIG. 2, an evasion maneuver, as is represented by double-dotted movement trajectories 11 and 12, may correspond to double-dotted curve 19 in the braking force/time diagram illustrated in FIG. 3. In this case, the braking force over the time constant may amount to the value zero, since there may be no deceleration of the vehicle. The combined braking and steering maneuver, e.g., carried out by the vehicle, according to triple-dotted movement trajectory 14 is represented in the braking force/time diagram illustrated in FIG. 3 as a triple-dotted curve. In this case, there may be a very sharp deceleration at first, which may mean the braking force at small times has a high value. In the further course, curve 20 falls off, since the intensity of the deceleration is reduced in order to go over to a steering intervention. Through this combination of braking and steering, in a first phase in which braking force is high, velocity v1 of vehicle 9 is sharply reduced, in order to then carry out a steering maneuver in a second phase with only weak deceleration force, to avoid a collision with vehicle 10.

Figure 4:
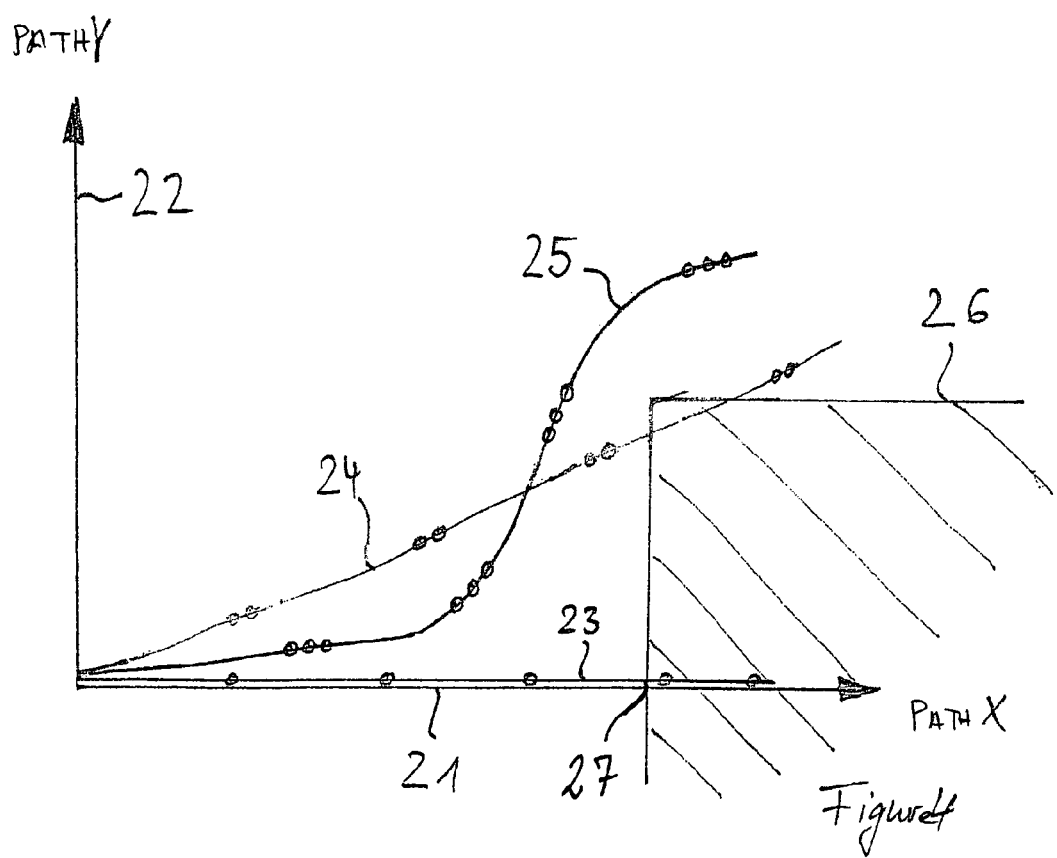
FIG. 4 illustrates the evasion paths of the various trajectories illustrated in FIG. 2.

FIG. 4 illustrates a further diagram in which lateral evasion path y is plotted against longitudinal path x. In one partial area of this y-x diagram, a hatched area 26 is illustrated which represents the obstacle. This area 26 represents the region which the evasion trajectory may not touch, in order to prevent a collision. In the case of a full brake application according to movement trajectory 13 from FIG. 2, a single-dotted curve 23, which indicates the spatial movement of the vehicle, results in this y-x diagram. Since in this case no steering maneuver takes place, this single-dotted line 23 is on the x axis. Because of small distance 15 between both vehicles 9 and 10, as of point 27, line 23 touches hatched area 26 which represents the obstacle. As of this point of time, there is a collision of vehicle 9 with the object, vehicle 10 in the case illustrated.

The pure steering maneuver as is illustrated in FIG. 2 by double-dotted movement trajectories 11 and 12 is represented in the y-x diagram of FIG. 4 as a double-dotted line 24. Value y increases continually as a function of path x, which includes the cornering of vehicle 9. As of value 27, line 24 also touches hatched area 26 which represents the obstacle. A collision of both vehicles 9 and 10 may occur in this case, as well.

The combined braking/steering maneuver according to triple-dotted movement trajectory 14 is illustrated in the y-x diagram of FIG. 4 as a triple-dotted line 25. The initially weak steering movement, but strong braking deceleration, causes curve 25 to run very flat at the beginning, but as it continues it increases very sharply in the direction of greater y-values, since the braking deceleration is reduced and the steering intervention is intensified. Due to a strongly reduced initial velocity, it is possible to later carry out a sharper steering movement than is represented by line 24. In this case, it is possible to prevent the collision of the two vehicles.

The method of the present invention may calculate all possible movement trajectories which are between the two extreme trajectories illustrated, namely, on one hand, a pure full brake application without steering intervention 13, and on the other hand, a maximum possible steering movement without braking intervention 11 or 12. However, all the calculated trajectories may have in common that the forces affecting the wheels correspond, e.g., to the forces arranged on the Kamm circle.

In this context, a great number of possible movement trajectories may be possible. The trajectories which, within their course, have points at which the force resulting from the longitudinal and lateral components becomes considerably greater or considerably smaller than is permitted by the Kamm circle illustrated in FIG. 1 remain unconsidered. The computing expenditure for trajectory estimation may thereby be reduced considerably. In these cases, the considered trajectory may lead to a loss of wheel adhesion on the road. Accordingly, those movement trajectories may prove to be actually useful and executable which, viewed over their entire further course, only just have a sufficient frictional grip of the wheels on the roadway at each point of time.

The frictional grip of the wheel on the roadway is variable due to changes in the weather conditions or the outside temperature. To take these changes of the coefficient of friction $\mu$max into account, the radius of Kamm circle 2 is constantly updated. This is accomplished, for example, by taking into account the outside temperature, by taking into account the weather conditions, in that a signal from a rain sensor is supplied, and in that interventions of an anti-lock device or an electronic stability program are evaluated, and changes in the coefficient of friction are passed on to the automatic emergency braking system.

What is claimed is:

1. A method for predicting movement trajectories of a vehicle for one of preventing a collision and reducing crash severity, comprising:
    predicting all movement trajectories of the vehicle for which forces occurring at wheels of the vehicle are, at each instance of each of the trajectories, a maximum force capable of being transferred from the wheels to a road without the wheels losing adhesion to the road, the maximum force capable of being transferred from the wheels to the road being substantially equal to $\mu$max*Fn, $\mu$max being a coefficient of friction between a roadway and a tire of the wheels of the vehicle, Fn being a vertical force applied by the vehicle to the roadway, the movement trajectories having a combination of steering actuation and brake actuation;
    determining $\mu$max in accordance with signals from at least one of an anti-lock device and an electronic stability program;
    detecting an object by a surroundings sensor system, the surroundings sensor system including at least one of a radar sensor, a lidar sensor and a video sensor; and
    wherein the determining $\mu$max includes evaluating additional signals from a rain sensor.

2. The method according to claim 1, further comprising:
    one of avoiding a collision of the vehicle with the object detected by the surroundings sensor system and reducing a severity of an unavoidable crash in accordance with the predicted movement trajectories in at least one of automatic control of deceleration devices and automatic control of vehicle steering devices.

3. A device for predicting movement trajectories of objects, comprising:
    at least one surroundings sensor system configured to supply signals;
    a prediction device configured to pre-calculate all movement trajectories of a vehicle, having a combination of steering actuation and brake actuation, for which forces occurring at wheels of the vehicle are, at each instance of each of the trajectories, a maximum force capable of being transferred from the wheels to a road without the wheels losing adhesion to the road, the maximum force capable of being transferred from the wheels to the road being substantially equal to $\mu$max*Fn, $\mu$max being a coefficient of friction between a roadway and a tire of the wheels of the vehicle, Fn being a vertical force applied by the vehicle to the roadway; and
    a rain sensor;
    wherein $\mu$max is determined in accordance with signals from at least one of an anti-lock device and an electronic stability program;
    wherein the surroundings sensor system detects an object, the at least one surroundings sensor system including at least one of a radar sensor, a lidar sensor and a video sensor; and
    wherein additional signals from the rain sensor are evaluated for determining $\mu$max.

4. The device according to claim 3, further comprising an arrangement configured to calculate movement trajectories for the vehicle and the object detected by the surroundings sensor system.

5. The device according to claim 3, further comprising an output device configured to automatically actuate at least one of vehicle deceleration devices and vehicle steering devices.

6. The device according to claim 3, further comprising:
    an arrangement configured to calculate movement trajectories for the vehicle and the object detected by the surroundings sensor system; and
    an output device configured to automatically actuate at least one of vehicle deceleration devices and vehicle steering devices.

* * * * *